Patented Sept. 6, 1932

1,875,943

UNITED STATES PATENT OFFICE

WINFIELD SCOTT, OF NITRO, WEST VIRGINIA, ASSIGNOR TO THE RUBBER SERVICE LABORATORIES COMPANY, OF AKRON, OHIO, A CORPORATION OF OHIO

RUBBER VULCANIZATION ACCELERATOR

No Drawing. Application filed January 14, 1928. Serial No. 246,919.

This invention is directed to the manufacture of vulcanized rubber by a process wherein there is employed as an accelerator of the vulcanization step, a new compound capable of causing the vulcanization process to be completed in a relatively short period of time and of imparting highly desirable and commercially important characteristics to the vulcanized product.

More particularly this invention is directed to the use as rubber vulcanization accelerators of a new type of compounds, which may be designated as organic xanthates. It is well known that the metallic salts of various xanthic acids have been prepared and proposed as accelerators of vulcanization. Such compounds have not met with general success as accelerators due primarily to their instability and their tendency to cause scorching or prevulcanization during the milling of a rubber stock. Metallic xanthates also fail for application as accelerators in that they can be used only at low vulcanization temperatures (5 to 10 pounds steam pressure per square inch); whereas, it is often necessary that such rapid accelerators should be active at higher temperatures also.

The type of organic xanthates to which this invention refers are reaction products of a secondary amine with a metallic ethyl xanthate. One example of such a product is piperidine ethyl xanthate. This new compound has been found to have none of the drawbacks of metallic xanthates and has in addition the advantage of being water soluble which makes it valuable in the vulcanization of rubber in the form of latex or of dispersions.

Piperidine-ethyl-xanthate has been prepared by causing substantially equal mols of piperidine hydrochloride, sulphate or other suitable salt and a soluble salt of ethyl xanthic acid such as potassium or sodium ethyl xanthate to react in alcoholic solution. The alkali chloride was precipitated and filtered off, leaving an alcoholic solution of piperidine ethyl xanthate, which was obtained sufficiently pure for use in the process set forth by evaporation of the alcohol preferably in vacuuo when the piperidine ethyl xanthate was obtained as a crystalline solid. It is not necessary to further purify this residue after evaporating the alcoholic solution of piperidine ethyl xanthate since it contains no products detrimental to rubber and can be prepared of substantially constant composition by using uniformly pure materials for its preparation. This can be readily done since both piperidine hydrochloride and potassium or sodium xanthate can be prepared in constant purity.

The reaction products of other secondary amine hydrochlorides such as di-isoamylamine, dibutylamine and dibenzylamine and potassium ethyl xanthate have been prepared by proceeding in a like manner.

Other methods of preparing my preferred type of compound may, of course, be employed.

In carrying out the invention in its preferred form, a rubber mix comprising 100 parts of rubber, for example pale crepe rubber, 5 parts zinc oxide, 0.25 parts of ferric oxide, 2 parts of sulfur, is prepared in the well known manner and to this mix 0.30 parts of one of my new type of accelerators, for example piperidine ethyl xanthate, is incorporated therein.

The following table shows the results of the tensile tests obtained from sheets of rubber vulcanized in a mould for different lengths of time at the temperatures obtained from 5, 10, 20 and 40 pounds of steam pressure per square inch.

| Time of cure minutes | Pressure lbs. steam | Modulus of elasticity in lbs/in$^2$ at elongations of | | | Tensile at break | Elongation at break % |
|---|---|---|---|---|---|---|
| | | 300% | 500% | 700% | | |
| 102 @ | 5# | 201 | 439 | 1890 | 3655 | 825 |
| 45 @ | 10# | 161 | 336 | 1270 | 3615 | 900 |
| 45 @ | 20# | 296 | 737 | 1920 | 2150 | 755 |
| 10 @ | 40# | 130 | 275 | 705 | 2170 | 900 |

It will be observed that better results are obtainable at lower vulcanization temperatures which is in keeping more with the behavior of the metallic xanthates than with other nitrogen containing ultra and semi ultra accelerators.

Piperidine ethyl xanthate is a powerful accelerator for highly compounded stocks (as are used in the treads of pneumatic tires) cured at lower steam pressures. Such stocks possess a high modulus of elasticity and an excellent resistance to abrasion and tearing.

A typical tire tread stock was made up as follows:

| | Parts |
|---|---|
| Smoked sheet rubber | 36.5 |
| No. 2 amber crepe rubber | 20.0 |
| Carbon black | 25.0 |
| Cycline (mineral and cottonseed) oil | 1.0 |
| Stearic acid | 1.0 |
| Mineral rubber | 3.5 |
| Zinc oxide | 11.0 |
| Sulfur | 2.0 |
| Piperidine ethyl xanthate | 0.3 |

A sample of rubber prepared from this formula was fully vulcanized in 30 minutes at a temperature obtained from 30 pounds of steam pressure per square inch. The following table shows the results of the tensile tests obtained from sheets of rubber vulcanized for 30 and 90 minutes at the temperature obtained from 30 pounds of steam pressure per square inch.

| Cure minutes at 30# steam pressure | Tensile at 300% elongation | Tensile at 500% elongation | Tensile at break | Elongation at break |
|---|---|---|---|---|
| 30 | 1600 | 3625 | 4725 | 605 |
| 90 | 1675 | 3685 | 4470 | 580 |

It can be seen from the tensile results that such a stock does not deteriorate appreciably on a long overcure as the modulus figures show no decrease at the longer period of cure. Such an accelerator finds application in the vulcanization of thick articles, which due to the low heat conductivity of rubber, must necessarily be cured for long periods of time.

A stock suitable for a tire cushion was prepared and tested, using one of my new type of compounds, for example piperidine ethyl xanthate, as an accelerator. The stock consisted of 100 parts of rubber, for example pale crepe rubber, 15 parts of zinc oxide, 2 parts sulfur and 0.2 parts of piperidine ethyl xanthate. After vulcanizing for 20 minutes at 280° F., the cured product showed a load at 700% elongation of approximately 1000 pounds per square inch and a tensile at break of 2700 pounds per square inch.

A hard rubber stock was prepared as follows:

| | Parts |
|---|---|
| No. 2 amber crepe | 20.0 |
| Smoked sheet | 20.0 |
| Lime | 5.0 |
| Zinc oxide | 17.5 |
| Mineral rubber | 10.0 |
| Sulfur | 27.5 |
| Piperidine ethyl xanthate | 0.5 |

A very hard rubber product was obtained by vulcanizing the above stock for two hours at 287° F. (40 pounds of steam pressure per square inch).

Other organic xanthates have been prepared, according to the manner I have outlined, from di-isoamylamine, di-n-butylamine, and dibenzylamine. These reaction products (e. g. di-isoamylamine ethyl xanthate, di-n-butylamine ethyl xanthate and dibenzylamine ethyl xanthate) were incorporated into a rubber mix comprising 100 parts rubber, for example pale crepe rubber, 5 parts of zinc oxide, 3.5 parts of sulfur, and 0.25 parts accelerator, and vulcanized at 287° F. (40 pounds steam pressure per square inch) for approximately 30 minutes whereby products exhibiting the physical characteristics as indicated in the following table were obtained. In the following table accelerator No. 1 means di-isoamylamine ethyl xanthate; accelerator No. 2 means di-n-butylamine ethyl xanthate; accelerator No. 3 means dibenzylamine ethyl xanthate.

| Accelerator No. | Cure minutes at 40# steam pressure | Modulus of elasticity in lbs/in² at elongations of | | | Tensile at break | Elongation at break % |
|---|---|---|---|---|---|---|
| | | 300% | 500% | 700% | | |
| 1 | 30 | 167 | 295 | 960 | 3070 | 900 |
| 2 | 30 | 154 | 298 | 855 | 2735 | 880 |
| 3 | 30 | 134 | 233 | 424 | 1975 | 945 |

Although I have described several examples whereby my new type of compounds may be prepared and used as rubber vulcanization accelerators, it is to be understood that this invention is not limited to the specific examples set forth herein for illustrative purposes and that modifications of the invention may be resorted to without departing from the spirit thereof or the scope of the appended claims.

What is claimed is:

1. The process of preparing vulcanized rubber which comprises heating rubber and a vulcanizing agent in the presence of a compound possessing the formula $$C_2H_5O.CSSH.R,$$

where R is a completely hydrogenated cyclic amine.

2. The process of preparing vulcanized rubber which comprises heating rubber and a vulcanizing agent in the presence of one of a group of compounds consisting of piperidine-ethyl-xanthate, diiso-amyl amine-ethyl xanthate, dibutylamine-ethyl-xanthate and dibenzyl-amine-ethyl-xanthate.

3. The vulcanized rubber product obtained by treating rubber and a vulcanizing agent in the presence of a compound possessing the formula $C_2H_5O.CSSH.R$, where R is a completely hydrogenated cyclic amine.

4. The vulcanized rubber product obtained by treating rubber and a vulcanizing agent in the presence of one of a group of compounds consisting of piperidine-ethyl-xanthate, diiso-amyl amine-ethyl-xanthate, dibutylamine-ethyl-xanthate and dibenzyl-amine-ethyl-xanthate.

5. The process of preparing vulcanized rubber which comprises heating rubber and a vulcanizing agent in the presence of a secondary amine salt of ethyl xanthic acid.

6. The process of preparing vulcanized rubber which comprises heating rubber and a vulcanizing agent in the presence of a secondary aliphatic amine salt of ethyl xanthic acid.

7. The vulcanized rubber product obtained by heating rubber and a vulcanizing agent in the presence of a secondary amine salt of ethyl xanthic acid.

8. The vulcanized rubber product obtained by heating rubber and a vulcanizing agent in the presence of a secondary aliphatic amine salt of ethyl xanthic acid.

In testimony whereof I hereunto affix my signature.

WINFIELD SCOTT.